May 23, 1961   L. LADENBURGER ET AL   2,984,922
PICTURE MOUNT
Filed July 16, 1959

INVENTORS
LEONARD LADENBURGER
WILLIAM A. CHILCOTE
BY
ATTORNEY

# United States Patent Office 2,984,922
Patented May 23, 1961

2,984,922

PICTURE MOUNT

Leonard Ladenburger and William A. Chilcote, Shaker Heights, Ohio, assignors to The Chilcote Company, Cleveland, Ohio, a corporation of Ohio Filed July 16, 1959, Ser. No. 827,538

4 Claims. (Cl. 40—159)

This invention relates to photographic mounts and more particularly to mounts of the type in which a photo or other display is inserted or slipped into the mount, whether the mount is to be used as an easel, folder or hook mount.

It is an important object of our invention to provide a mount for photographs, displays and the like which includes a frame for the photo or display, preferably in the form of a molded plastic frame secured to the backing panel of the mount by suitable means such as adhesive, and providing therebetween a pocket for receiving the photograph or display.

Another object of the invention is a mount of the type disclosed, including a molded frame member having marginal means projecting rearwardly from its rear face along all but one side of the frame to space the frame marginally from the backing panel to which it is secured.

A further object of our invention is a mount frame member molded in one piece from a suitable plastic material, such as styrene, or the like, in which certain of the marginal portions of the frame are formed with an integral rearwardly disposed rib to engage with and be secured to the backing panel of the mount to space the frame marginally therefrom.

Another object of this invention is a plastic photo frame forming a part of a photo mount construction and having a rearwardly disposed spacing means marginally located along the frame and adapted to receive an adhesive application along its rear surface whereby the frame may be securely attached to a mount backing panel to provide a photo receiving pocket therebetween.

Still another object of the invention is to provide a picture frame having a viewing opening and a marginal spacing means along a portion of its rear marginal face to space the frame from a mount backing panel to which it is glued, cemented or otherwise attached and in which the spacing means is located inwardly of certain of the outer peripheral edges of the frame to provide a marginal space between said means and the said outer peripheral edges of the frame for receiving excess adhesive which may be forced outwardly as pressure is applied in securing the frame in the mount.

Another object of the invention is a frame member for a photo mount which is durable, pleasing in appearance, relatively inexpensive to manufacture because of its adaptability to high production, and which is easy to assemble in a mount forming therewith a photo or picture receiving pocket.

Other objects and advantages of this invention will become more apparent as the following description of embodiments thereof progresses, reference being made to the accompanying drawing in which like reference characters are employed to designate like parts throughout the same.

Figure 1:
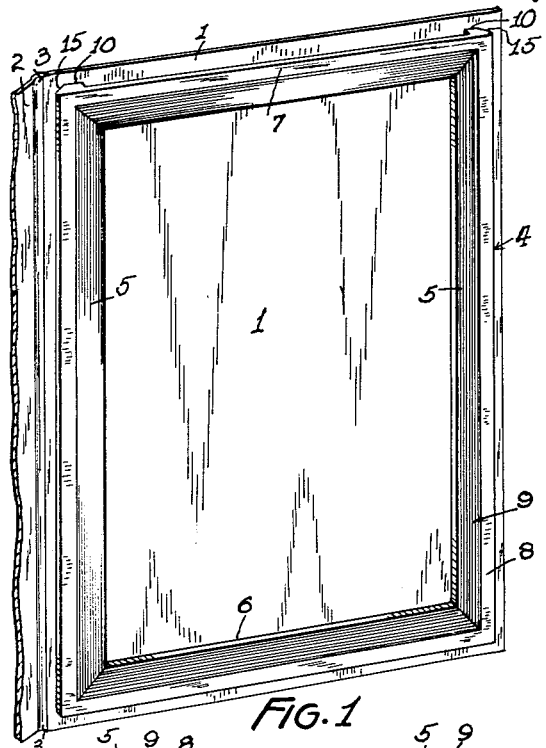
Figure 1 is a perspective front view of a photo, picture or display mount embodying one form of our invention and illustrates the frame applied in use.

In carrying out our invention as illustrated in the accompanying drawing, a sheet of cardboard or other suitable sheet material is formed to provide a rectangular backing panel 1 and a cover panel 2 hingedly connected together at 3.

A rectangular frame 4 comprising side members 5, a bottom 6 and a top 7 is preferably formed by molding a suitable plastic material. A wide variety of colors, graining and finishes may be employed in the manufacture of the frames to provide selectivity when choosing a frame for a particular photo, picture or display, together with panels of the selected mount.

The front face of the frame may be beveled upwardly from the flat marginal portion 8, as at 9, toward the inner edges of the frame defining the viewing opening, thus imparting an illusion of depth in viewing a photograph or picture carried in the mount.

Figure 2:
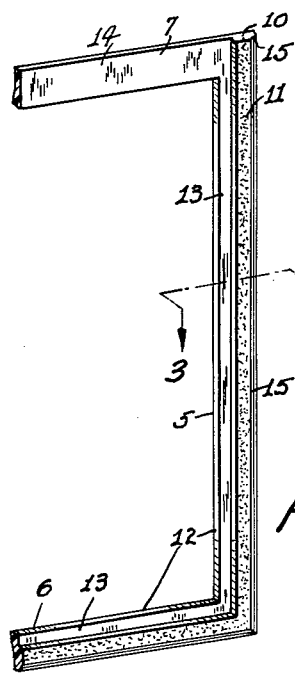
Figure 2 is a fragmentary view of the frame shown in Figure 1, but viewed from the rear showing one form of marginal spacing means and the excess adhesive receiving area.
Figure 3:
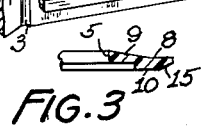
Figure 3 is a section taken on line 3—3 of Figure 2.

Referring more particularly to Figs. 1, 2 and 3 which are illustrative of one form of the frame which may be used in mounts embodying our invention and with particular reference to Figs. 2 and 3, it will be seen that we provide a marginal spacing rib 10 projecting rearwardly from three sides of the rectangular frame, that is, preferably along the two side frame members and along the bottom of the frame. The rib 10 projects rearwardly only sufficiently to space the frame marginally around the viewing opening from the backing panel 1 to slidably receive a print or photo therebetween, when the frame is secured thereto by means of a layer of adhesive 11 which is applied to the rear flat surface of the rib, as shown more particularly in Fig. 2.

It will be noted that the rib 10 is disposed inwardly of the marginal edges 12 defining the viewing opening of the frame and is also disposed inwardly of the outer marginal edges of the side and bottom frame members 5, 6 and 7. Thus, the frame when assembled in the mount will be spaced from the backing panel 1 and the side and bottom inner surfaces 13 of the frame between the rib and the edges of the viewing opening, together with the front face of the backing panel 1 when the frame is mounted, as in Fig. 1, provide a pocket for receiving the photograph, display or the like which is inserted in the top of the frame, as at 14, between the frame and the panel 1 and slid downwardly therebetween.

Referring more particularly now to Figure 3, it will be noted that the rib 10 is beveled along its outer edge inwardly toward the front of the frame, as at 15. When adhesive 11 is applied to the rear flat face of the rib 10 and the frame is pressed into position against the backing panel 1 in completing the amount, excess adhesive, if any, will tend to flow outwardly along the inclined or beveled marginal surface 15 and to be trapped between this surface and the flat surface of the backing panel and of course be hidden from view.

Figure 6:
Figure 6 is a section taken on line 6—6 of Figure 5 showing the modified excess adhesive receiving area marginally disposed around certain sides of the frame.
Figure 4:
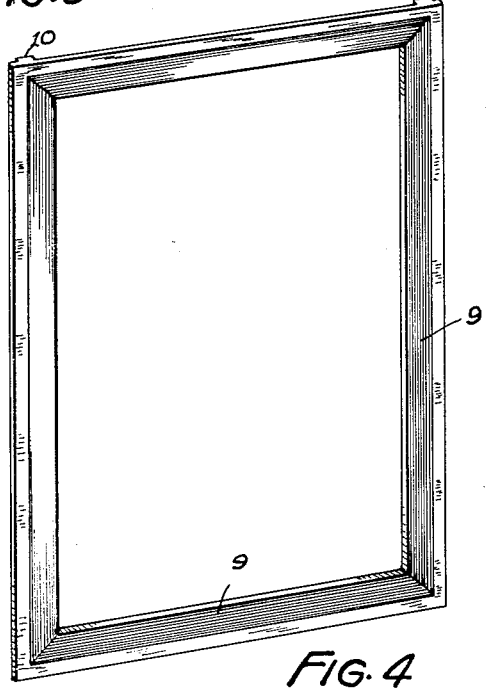
Figure 4 is a perspective front view of a frame member embodying a modified form of our invention.
Figure 5:
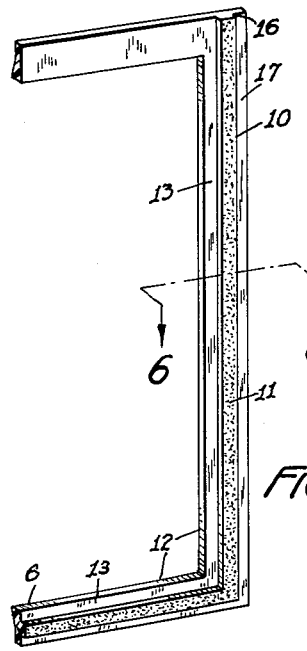
Figure 5 is a rear fragmentary view of the frame shown in Figure 4.

In Figs. 4, 5 and 6, we have illustrated a modified form of the invention which embodies the general features of the embodiment already described above but differs in particular with respect to the form of the rib 10 which extends marginally along three sides of the frame.

In this form of the invention, the rib 10 is provided with a flat back surface to which adhesive or cement or the like may be applied, as shown in Fig. 5, for securing the frame to a backing panel 1. The rib 10 is provided with an outer side wall 16 which is substantially perpendicular to the rear face of the frame and which forms with the marginal area 17 between the rib and the outer edge of the frame an elongate two sided channel which is adapted to receive any excess adhesive or cement which is extruded outwardly over the outer edge of the rib and into the channel formed between the walls 16 and 17 when the frame is pressed into position against the backing panel 1 in completing the mount. As in the embodiment first described, this excess cement or adhesive entering the channeled area 17 will be hidden from view and of course will not interfere with the insertion or removal of a print or photo in the pocket formed between the backing panel and the perpendicular walls when the same are secured together to complete the mount. The rib 10 spaces the peripheral walls of the frame from the backing panel sufficiently to permit easy access for a print or photo along the walls 13 forming the pocket with the forward surface of the backing panel 1.

Various changes may be made in the details of construction and arrangement of parts of the invention without departing from the spirit thereof or the scope of the appended claims.

We claim:

1. A photo mount comprising a backing panel and a photo frame formed as a unitary structure having a viewing opening, said frame having a raised portion formed along its back surface to space the frame from the panel and to thereby provide with the panel a photo receiving pocket surrounding the opening in the frame, and an adhesive layer between the rear surface of the raised portion and the panel to bind the same together under initial relatively light pressure, said raised portion lying within and spaced from the inner and outer marginal edges of certain of the sides of the frame.

2. A photo mount comprising a backing panel and a photo frame formed as a unitary structure having a viewing opening, said frame having a raised portion formed along its back surface to space the frame from the panel and to thereby provide with the panel a photo receiving pocket surrounding the opening in the frame, and an adhesive layer between the rear surface of the raised portion and the panel to bind the same together under initial relatively light pressure, said raised portion lying within the inner and outer marginal edges of certain of the sides of the frame, one side wall of said raised portion forming with the adjacent back surface of the frame a marginal space for receiving and containing excess adhesive expelled from between the panel and raised portion of the frame under pressure when the frame is being secured to the panel.

3. A frame member for assembly with a backing panel of a photo mount, said frame comprising a unit of geometrical form having a central viewing opening and formed as a unitary structure, said frame having a front face comprising a forwardly beveled portion and a flat marginal portion, said frame having marginally arranged ribs extending inwardly of its inner face to space the frame from its panel when it is assembled thereon, said ribs being inwardly disposed of the outer edges of the frame, to provide a marginal space for receiving excess adhesive discharge from between the ribs and a backing panel when the frame is adhesively attached to a backing panel under light pressure.

4. A frame member for assembly with a backing panel of a photo mount, said frame comprising a unit of geometrical form having a central viewing opening and formed as a unitary structure, said frame having a front face comprising a forwardly beveled portion and a flat marginal portion, said frame having marginally arranged ribs extending inwardly of its inner face to space the frame from its panel when it is assembled thereon, said ribs being inwardly disposd and spaced from the outer edges of the frame, the outer side walls of said ribs being normal to the adjacent inner marginal surface of the frame.

References Cited in the file of this patent

UNITED STATES PATENTS

| | | |
|---|---|---|
| 519,256 | Greene | May 1, 1894 |
| 1,425,874 | Levick | Aug. 15, 1922 |
| 1,956,527 | DeGroot | Apr. 24, 1934 |
| 2,093,598 | Clark | Sept. 21, 1937 |

FOREIGN PATENTS

| | | |
|---|---|---|
| 135,044 | Great Britain | Nov. 20, 1919 |
| 361,927 | France | Nov. 21, 1906 |
| 722,249 | France | Dec. 28, 1931 |